United States Patent
Marielle

(10) Patent No.: US 7,473,082 B2
(45) Date of Patent: Jan. 6, 2009

(54) PUMPING SYSTEM WITH PROGRESSIVE CAVITY PUMP

(75) Inventor: Jean-Pierre Marielle, Le Mesnil Esnard (FR)

(73) Assignee: PCM Pompes, Vanves (FR)

( * ) Notice: Subject to any disclaimer, the term of this patent is extended or adjusted under 35 U.S.C. 154(b) by 450 days.

(21) Appl. No.: 11/253,168

(22) Filed: Oct. 17, 2005

(65) Prior Publication Data

US 2006/0083637 A1 Apr. 20, 2006

(30) Foreign Application Priority Data

Oct. 20, 2004 (FR) .................................. 04 11160

(51) Int. Cl.
*F01C 1/10* (2006.01)
*F03C 2/00* (2006.01)
*F04C 18/00* (2006.01)

(52) U.S. Cl. .................... 418/48; 418/182; 403/362; 411/393; 417/410.3; 417/360

(58) Field of Classification Search ............. 418/48, 418/182; 417/410.3, 360; 166/105.5, 107, 166/68, 105; 175/323, 107; 411/393; 403/362; 464/182
See application file for complete search history.

(56) References Cited

U.S. PATENT DOCUMENTS

| 3,539,279 A | 11/1970 | Rider et al. | |
|---|---|---|---|
| 3,600,113 A * | 8/1971 | Pahl et al. | 418/48 |
| 4,237,704 A | 12/1980 | Varadan | |
| 5,085,564 A * | 2/1992 | Naylor et al. | 418/48 |
| 6,868,912 B2 * | 3/2005 | Proctor | 166/378 |

FOREIGN PATENT DOCUMENTS

| DE | 3816581 C1 | 9/1989 | |
|---|---|---|---|
| DE | 19530978 A1 * | 2/1997 | 418/48 |
| GB | 2377256 A * | 1/2003 | 418/48 |
| JP | 181081 | 7/1990 | |
| JP | 02181081 A * | 7/1990 | 418/48 |
| JP | 05087059 A * | 4/1993 | 418/48 |

OTHER PUBLICATIONS

"Patent Abstracts of Japan", vol. 014, No. 454 (M-1031), Sep. 28, 1990.

* cited by examiner

*Primary Examiner*—Theresa Trieu
(74) *Attorney, Agent, or Firm*—Patzik, Frank & Samotny Ltd.

(57) ABSTRACT

Pumping system comprising: a progressive cavity pump comprising a helical rotor inside a helical cavity of an outer stator; motor for driving the rotor, with a motor shaft coaxial to the axis of the stator cavity; and an intermediate shaft coupled, at its ends, by respective couplings, to the rotor shaft and to the motor shaft. Two devices consisting of two of these connected parts are constructed as a male device terminated by an axial stub and a female device terminated by an axial housing receiving the stub, at least two radial screws, not aligned, one of which is a cone-point set screw, connected the stub to the female device.

10 Claims, 3 Drawing Sheets

PUMPING SYSTEM WITH PROGRESSIVE CAVITY PUMP

FIELD OF THE INVENTION

The present invention relates to the field of progressive cavity pumps or Moineau pumps.

DESCRIPTION OF THE PRIOR ART

The invention relates more particularly to improvements made to a conventional construction of such a pumping system which is illustrated in FIG. 1 of the appended drawings, this pumping system comprising:
- a progressive cavity pump 1 comprising a helical rotor 2 inside a helical cavity 4 of an outer stator 3,
- motor means 5 for driving the rotor 2, said motor means driving a motor shaft 6 substantially coaxial to the axis of the stator cavity 4,
- an intermediate shaft 8 which is coupled rotation-wise both to the motor shaft 6 and to the shaft 14 of the rotor 2,
- a first articulated coupling 10 having one end connected to the motor shaft 6 and its other end connected to the intermediate shaft 8,
- a second articulated coupling 9 having one end connected to the intermediate shaft 8 and its other end connected to the shaft 14 of the rotor 2, and
- connected means for connected at least two of said connected parts.

Furthermore, a casing 11 housses the intermediate shaft 8 and is connected in a sealed manner to the stator 2 of the pump 1, this casing having a lateral opening 12 forming the intake (arrow 13) for the product to be forced by the pump 1.

Conventionally, the motor shaft 6 is smooth on the outside and is gripped by a sealing device 15, for example of the stuffing box type, which is secured axially by an intermediate casing (or flange) 16 providing the structural link between the end of said casing 11 and the casing of the motor means 5.

Although hitherto widely employed, this known construction does, however, present some drawbacks.

Firstly, all the units connected axially and rotation-wise are conventionally connected by means of pins, normally diametrical pins. Now, a pin joint requires the connected devices to be drilled diametrically. The presence of these diametrical drill holes significantly weakens the parts, such that the torques that can be transmitted are less than those that could be transmitted by solid parts. In other words, the transmission of a given torque requires the pin-jointed devices to be over-dimensioned, which is detrimental with regard to the rotating masses and the weight, and therefore the price, of these devices.

Also, the correct operation of such a construction requires as little play as possible; in particular, the pin must fit without appreciable play in the mutually aligned drill holes of the devices to be connected. Now, during assembly, the fitting of the pin requires an alignment of the drill holes of the devices that are to be connected that must be all the more accurate, and therefore difficult to achieve, as the drill holes are dimensionally a better fit to the diameter of the pin. But fitting the pin then becomes a difficult operation requiring a qualified operative.

Finally, some play, however small, remains between the pin and the connected devices. In particular, in operation, the eccentric rotation of the rotor shaft relative to the motor shaft (which is coaxial to the axis of the stator) means that the intermediate shaft moves about in a conical envelope. This results in rotation movements of the devices (ends of articulated couplings and ends of corresponding shafts) that are connected around the pin; despite the very low amplitude of these movements, they do cause a heating effect which becomes all the greater as the play is reduced and which, in the long term, causes a superficial welding of the devices (the "fritting" effect) making dismantling complicated, lengthy and therefore costly.

SUMMARY OF THE INVENTION

The object of the invention is to remedy, at least in part, the problems explained above and to propose a improved construction which gives better satisfaction to the various demands of the art, in particular in terms of structural simplicity, simplicity of assembly and disassembly, and cost.

To these ends, a pumping system as mentioned in the preamble is characterized, when constructed in accordance with the invention, in that said two connected devices are constructed in the form of a male device including an axial stub and a female device including an axial housing designed to receive said stub without appreciable play, in that the lateral wall defining said axial housing of the female device is provided with at least two radial tapped drill holes, angularly offset and not mutually aligned and respectively accommodating two screws, at least one of which is a cone-point set screw, and in that said axial stub of the male device includes at least two radial recesses respectively located in line with said radial drill holes, and at least one of which is conical or tapered in line with the said cone-point set screw to receive the end of same.

With these provisions, the two devices to be connected no longer need to be angularly positioned accurately relative to each other: with the two devices approximately mutually oriented, it is the cone-point set screw which, as it is tightened, brings them into a precise and correct orientation while its end bottoms in the conical recess provided in the male device. The result is a major simplification of the coupling process.

Furthermore, the coupled devices are no longer drilled diametrically: they therefore retain their mechanical strength and it thus becomes possible to transmit significantly greater torque (typically around 30% greater). In other words, for the transmission of a given torque, the coupled devices can be made smaller, and therefore become less costly.

Preferably, the lateral wall of the axial housing of the female device includes three radial tapped drill holes distributed angularly and the axial stub of the male device includes three radial recesses distributed angularly and respectively located in line with said drill holes. Advantageously, then, the drill holes and respective recesses are distributed angularly in an equidistant manner. Such an assembly no longer requires precise fitting of the coupled devices relative to each other, which not only reduces the machining costs and facilitates assembly, but also eliminates the "fritting" effect mentioned above; the devices can therefore be dismantled more easily and more quickly.

Depending on the envisaged construction, all the screws can be cone-point set screws and all the recesses can be conical or tapered, or only one screw can be a cone-point set screw and the other screw or screws can be dog-point set screws, in line with which the respective recesses of the stub are axisymmetrical.

Since the provisions according to the invention are of a general nature, they can be implemented to secure at least two devices of the rotating gear of the pumping system.

Thus, it is possible to envisage that it is the shaft of the rotor which is constructed to form the male device and it is the corresponding end of the second articulated coupling which is constructed to form the female device; and/or that it is the intermediate shaft which is constructed to form the male device and it is the corresponding end of the second articulated coupling which is constructed to form the female device; and/or that it is the intermediate shaft which is constructed to form the male device and it is the corresponding end of the first articulated coupling which is constructed to form the female device; and/or that it is the motor shaft which is constructed to form the male device and it is the corresponding end of the first articulated coupling which is constructed to form the female device. In practice, the motor shaft may include a link shaft or driver interposed between an output shaft of the motor means and said corresponding end of the first articulated coupling: in this case, it is the corresponding end of the driver which is constructed to form the male device. It is also possible for the driver to house, at least partly, a removable bushing for adaptation to an output shaft of given diameter of the motor means: in this case, the driver is constructed to form the female device and the adaptor bushing is constructed to form the male-device.

BRIEF DESCRIPTION OF THE DRAWINGS

The invention will be better understood from reading the following detailed description of certain preferred embodiments given purely as illustrative examples. In this description, reference is made to the appended drawings in which.

DETAILED DESCRIPTION OF THE INVENTION

Figure 1:
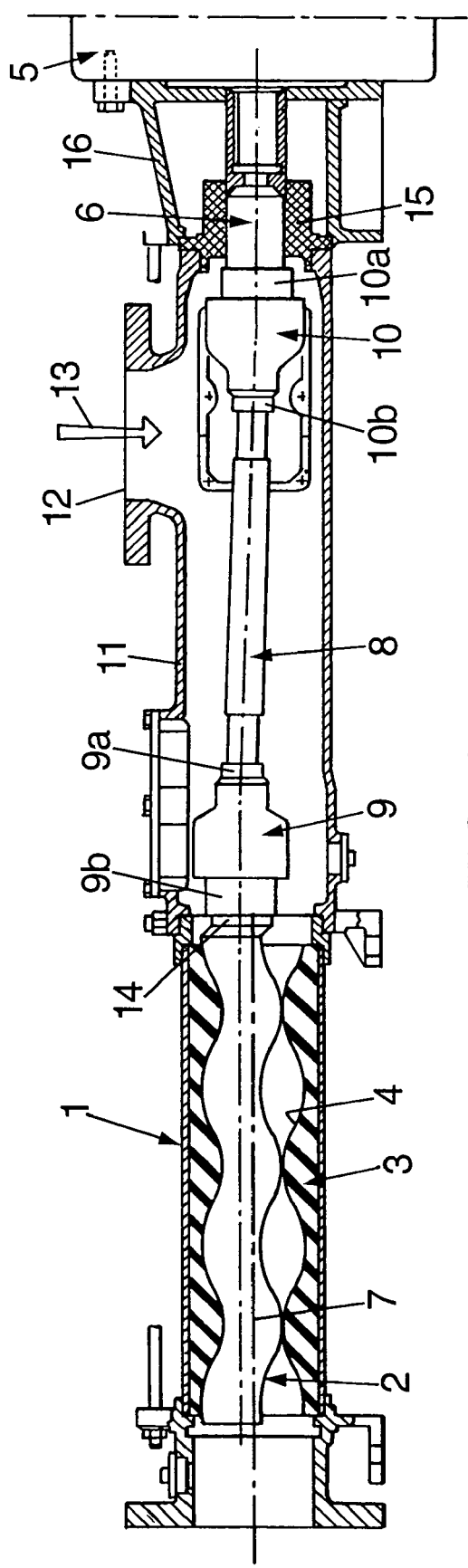
FIG. 1 is a diagrammatic overall view, from the side, of a pumping system for which the invention is intended.
Figure 2:
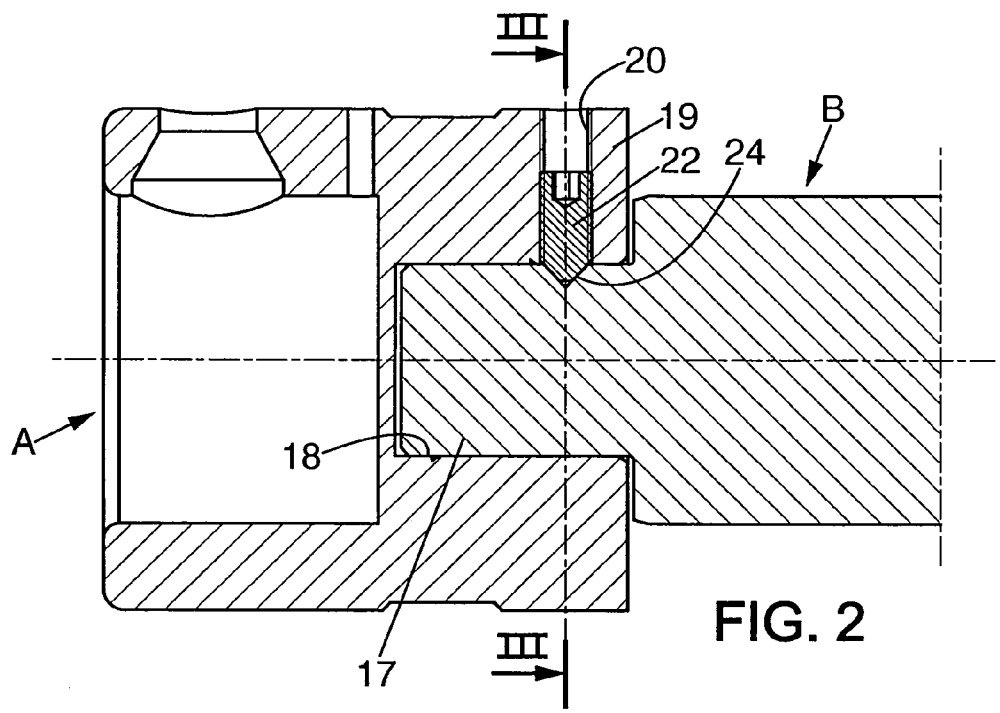
FIG. 2 is a diametrical cross-section view of two devices of the pump of FIG. 1 that are connected in accordance with the invention.

There now follows a description of the main provisions according to the invention with reference firstly and more particularly to FIG. 2. Although the provisions according to the invention can be implemented to secure any pair of devices A and B connected axially and rotation-wise in the rotary moving gear of the pump shown in FIG. 1 as will become more apparent later, it can be assumed, as an example and to give more definition to the ideas, that FIG. 2 shows (in reverse position relative to the representation of FIG. 1) the half-coupling 10b (device A) of the first articulated coupling 10 and the end of the intermediate shaft 8 (device B).

According to the invention, the two connected devices A, B are constructed in the form of a male device B including an axial stub 17 and a female device A including an axial housing 18 designed to receive said stub 17 without appreciable play. As can also be seen in FIGS. 3A and 3B, the lateral wall 19 defining said axial housing 18 of the female device A is provided with at least two radial tapped drill holes 20, 21, angularly offset and not mutually aligned and respectively accommodating two screws 22, 23, at least one 22 of which is a cone-point set screw. Finally, the axial stub 17 of the male device B includes at least two radial recesses 24, 25 respectively located in line with said radial drill holes 20, 21 of the female device A and at least one 24 of which is conical or tapered in line with the said cone-point set screw 22 to receive the end of same.

With this construction, the two devices A and B can be inserted one into the other without the drill holes 20, 21 and respective recesses 24, 25 needing to be precisely in line: the cone-point set screw 22, when tightened, will bring the two device A, B into a mutually correct position, both axially and angularly, so as to place in alignment the other drill hole and the other recess so enabling the other screw 23 to be fitted easily. Because the two screws 22, 23 are not positioned diametrically opposite and are not mutually aligned, these two screws do not form an axis of rotation for the two connected devices A, B. Thus, the two devices A, B can no longer make mutual swivelling movements and are firmly locked together.

Figure 3A:
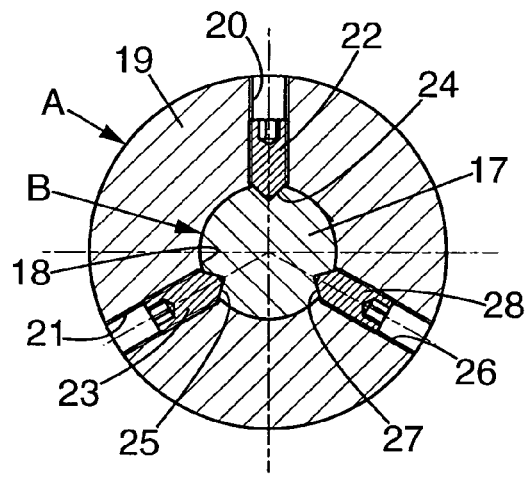
FIGS. 3A and 3B are two views, in transverse cross-section along the line III-III in FIG. 2 and on a larger scale, illustrating two possible exemplary embodiments of the provisions of FIG. 2.
Figure 3B:
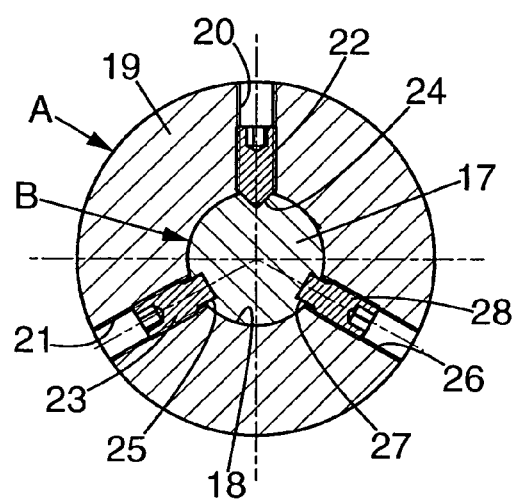

However, the locking together of the two devices A, B will be enhanced if the lateral wall 19 of the housing 18 of the female device A includes three radial tapped drill holes 20, 21 and 26 distributed angularly and the axial stub 17 of the male device B includes three radial recesses 24, 25 and 27 distributed angularly and respectively located in line with said drill holes 20, 21 and 26 (the third screw being designated 28), as shown in FIGS. 3A and B. The solution providing the most effective connection consists in having the drill holes 20, 21 and 26 and respective recesses 24, 25 and 27 distributed at equidistant angles (120°) as shown in FIGS. 3A and 3B.

Different exemplary embodiments of these provisions can be considered. A first example consists in all the screws being cone-point set screws and all the recesses being conical or tapered (as illustrated in FIGS. 2 and 3A). Another example, simpler to implement (just one conical bore required) consists in only one screw 22 being a cone-point set screw and in the other screws 23, 28 being dog-point set screws, in line with which the respective recesses 25, 27 of the stub 17 are axisymmetrical, as illustrated in FIG. 3B.

As already mentioned, the provisions according to the invention can be implemented to secure all or some of the parts that go to make up the rotating gear driving the rotor 2 of the pump from the motor means 5 as shown in FIG. 1.

Thus, it is possible for the shaft 14 of the rotor 2 to be constructed to form the male device B and for the corresponding end or corresponding half-coupling 9b of the second articulated coupling 9 to be constructed to form the female device A; and/or for the intermediate shaft 8 to be constructed to form the male device B and for the corresponding end or half-coupling 9a of the second articulated coupling 9 to be constructed to form the female device A; and/or for the intermediate shaft 8 to be constructed to form the male device B and for the corresponding end or half-coupling 10b of the first articulated coupling 10 to be constructed to form the female device A; and/or for the motor shaft 6 to be constructed to form the male device B and for the corresponding end or half-coupling 10a of the first articulated coupling 10 to be constructed to form the female device A.

Figure 4A:
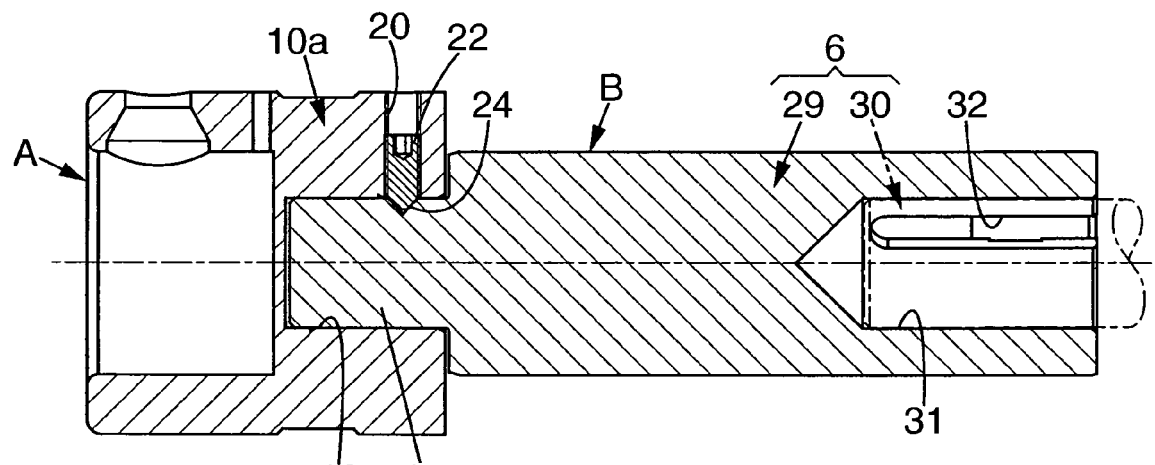
FIGS. 4A and 4B are diametrical cross-section views illustrating the implementation of the provisions of the invention in the case where the motor shaft is connected to a corresponding articulated coupling end, in two possible exemplary embodiments.

In practice, as illustrated in FIG. 4A, the motor shaft 6 includes a link shaft 29 which is interposed between said corresponding end or half-coupling 10a of the first articulated coupling 10 and an output shaft 30 (illustrated by broken lines) of the motor means 5; the output shaft 30 is, for example, received in an axial bore 31 slotted at 32 provided in the corresponding end of the link shaft 29 and the connected rotationwise of the output shaft 30, also slotted, and of the link shaft 29 is provided by a key (not shown). It is then the corresponding end 17 of the link shaft 29 which is constructed to form the male device B, whereas the half-coupling 10*a* of the first articulated coupling 10 forms the female device A.

Figure 4B:
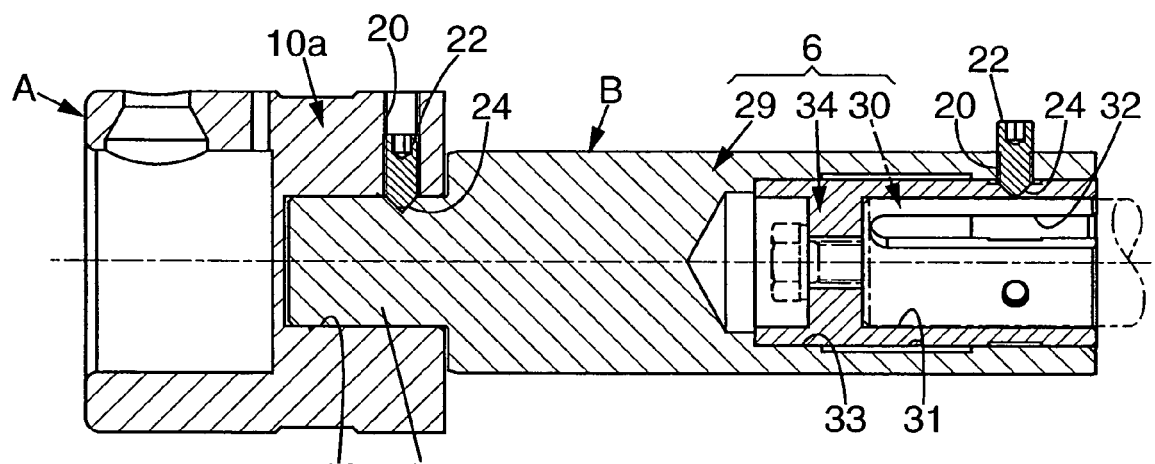

According to another configuration also used in practice and illustrated in FIG. 4B, the end of the link shaft 29 located nearest the motor means 5 is provided with an axial bore 33 which contains, at least partly, a removable bushing 34 (adaptor bushing), itself drilled with said axial bore 31 slotted at 32 having a diameter suited to a given diameter of the output shaft 30 (illustrated by broken lines) of the motor means 5. In this case, it is also possible for the corresponding end of the link shaft 29 to be constructed to form the female device A and for the adaptor bushing 34 to be constructed to form the male device B (only the cone-point set screw 22 is shown here).

What is claimed is:

1. A pumping system comprising:
   a progressive cavity pump or Moineau pump comprising a helical rotor having a shaft and being housed inside a helical cavity of an outer stator,
   motor means for driving the rotor, said motor means driving a motor shaft which extends substantially coaxial to an axis of the stator cavity,
   an intermediate shaft which is coupled rotation-wise both to the motor shaft and to the shaft of the rotor,
   a first articulated coupling having one end connected to the motor shaft and another end connected to the intermediate shaft,
   a second articulated coupling having one end connected to the intermediate shaft and another end connected to the shaft of the rotor, and
   connecting means for connecting two devices made up of two of said connected parts,
   wherein said two connected devices are constructed in the form of a male device including an axial stub and a female device including an axial housing designed to receive said stub without appreciable play,
   wherein a lateral wall defining said axial housing of the female device is provided with at least two radial tapped drill holes, angularly offset and not mutually aligned and respectively accommodating two screws, at least one of which is a cone-point set screw, and
   wherein said axial stub of the male device includes at least two radial recesses respectively located in line with said radial drill holes and at least one of which is conical or tapered in line with said cone-point set screw to receive the end of same, and
   wherein only one screw is a cone-point set screw and wherein the other screw or screws are dog-point set screws, in line with which the respective recesses of the stub are axisymmetrical.

2. The pumping system according to claim 1, wherein the lateral wall of the housing of the female device includes three radial tapped drill holes distributed angularly and the axial stub of the male device includes three radial recesses distributed angularly and respectively located in line with said drill holes.

3. The pumping system according to claim 2, wherein the drill holes and respective recesses are distributed angularly in an equidistant manner.

4. The pumping system according to claim 1, wherein all the screws are cone-point set screws and wherein all the recesses are conical or tapered.

5. The pumping system according to claim 1, wherein it is the shaft of the rotor which is constructed to form the male device and it is the corresponding end of the second articulated coupling which is constructed to form the female device.

6. The pumping system according to claim 1, wherein it is the intermediate shaft which is constructed to form the male device and it is the corresponding end of the second articulated coupling which is constructed to form the female device.

7. The pumping system according to claim 1, wherein it is the intermediate shaft which is constructed to form the male device and it is the corresponding end of the first articulated coupling which is constructed to form the female device.

8. The pumping system according to claim 1, wherein it is the motor shaft which is arranged to form the male device and it is the corresponding end of the first articulated coupling which is constructed to form the female device.

9. The pumping system according to claim 8, in which the motor shaft includes a link shaft interposed between an output shaft of the motor means and said corresponding end of the first articulated coupling, wherein it is the corresponding end of the link shaft being constructed to form the male device.

10. The pumping system according to claim 9, in which the link shaft houses, at least partly, a removable bushing for adaptation to an output shaft of given diameter of the motor means, wherein the link shaft is constructed to form the female device and the removable bushing is constructed to form the male device.

* * * * *